United States Patent [19]
Yuan

[11] Patent Number: 5,627,510
[45] Date of Patent: May 6, 1997

[54] VEHICULAR SAFETY DISTANCE ALARM SYSTEM

[76] Inventor: Zhiping Yuan, 9817 High Point Dr., Shreveport, La. 71106

[21] Appl. No.: 304,250

[22] Filed: Sep. 12, 1994

[51] Int. Cl.⁶ ...................................... B60Q 1/00
[52] U.S. Cl. ........................ 340/435; 180/271; 180/275; 340/436; 340/461; 340/903; 342/71; 364/461; 367/96; 367/112; 367/909
[58] Field of Search ...................... 340/435, 436, 340/901, 903, 904, 943, 552, 561, 565, 461; 364/460, 461; 180/271, 275; 342/70, 71; 367/96, 97, 107, 112, 909; 116/62.4, 62.1, 62.3, DIG. 36, DIG. 47, 290, 295, 293, 300, 301, 302, 284, 282

[56] References Cited

U.S. PATENT DOCUMENTS

| | | | |
|---|---|---|---|
| 2,175,129 | 10/1939 | Rolfson | 116/62.4 |
| 2,340,403 | 2/1944 | Morley et al. | 116/62.4 |
| 2,679,229 | 5/1954 | Roderman | 116/62.4 |
| 4,168,499 | 9/1979 | Matsumura et al. | 342/70 |
| 4,180,816 | 12/1979 | Endo et al. | 342/70 |
| 4,208,658 | 6/1980 | Fujiki et al. | 342/70 |
| 5,139,327 | 8/1992 | Tanaka | 348/170 |
| 5,159,557 | 10/1992 | Ogawa | 364/460 |
| 5,187,537 | 2/1993 | Asayama | 348/170 |
| 5,212,467 | 5/1993 | Park | 340/435 |
| 5,214,408 | 5/1993 | Asayama | 340/436 |
| 5,235,316 | 8/1993 | Qualizza | 340/435 |
| 5,268,692 | 12/1993 | Grosch et al. | 342/70 |
| 5,347,273 | 9/1994 | Katiraie | 340/435 |
| 5,388,048 | 2/1995 | Yavnayi et al. | 364/461 |
| 5,436,835 | 7/1995 | Emry | 364/461 |

*Primary Examiner*—Nina Tong

[57] ABSTRACT

A vehicular safety distance alarm system for monitoring a travelling distance between a source vehicle and a target vehicle and activating an alarm when a predetermined safety distance defined between the two for a given speed is compromised comprising a distance measurement mechanism coupled to a source vehicle for determining and transmitting a distance signal representing a travelling distance between the source vehicle and a remote target vehicle; a selection mechanism coupled to the source vehicle for allowing a driver to select a desired range of safety distances expressed as a function of source vehicle velocity and a set time to reach a target vehicle; an alarm signal generation mechanism coupled to the distance measurement mechanism and selection mechanism for comparing the distance signal to a safety distance at a given source vehicle velocity and transmitting an alarm signal when the safety distance is compromised; and an alarm mechanism coupled to the alarm signal generation mechanism for providing an indication upon receipt of an alarm signal.

1 Claim, 4 Drawing Sheets

| RELATIONSHIP BETWEEN SPEED AND SAFETY DISTANCE | | | | | | | | | | | | | |
|---|---|---|---|---|---|---|---|---|---|---|---|---|
| SPEED (MPH) | 10 | 20 | 30 | 40 | 50 | 60 | 70 | 80 | 90 | 100 | 110 | 120 | 130 |
| 2 SEC DIST. (FT.) | 29 | 58 | 88 | 117 | 147 | 176 | 205 | 235 | 264 | 293 | 323 | 352 | 381 |
| 3 SEC DIST. (FT.) | 44 | 88 | 132 | 176 | 220 | 264 | 308 | 352 | 396 | 440 | 484 | 528 | 572 |
| 4 SEC DIST. (FT.) | 58 | 117 | 176 | 235 | 294 | 352 | 411 | 470 | 528 | 587 | 646 | 724 | 763 |

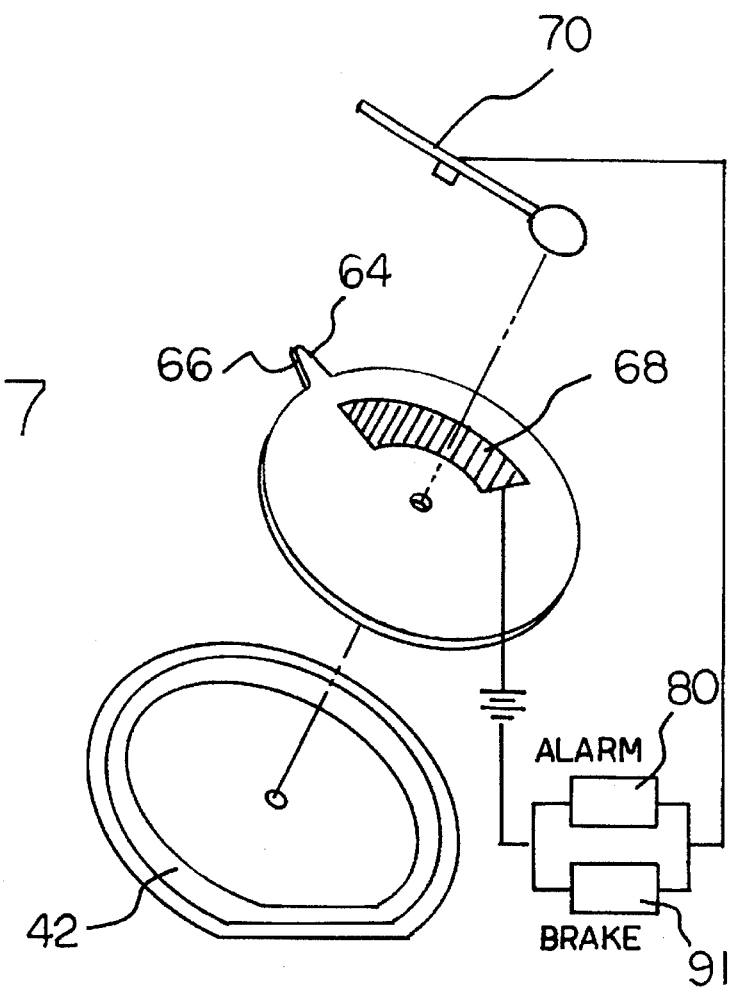
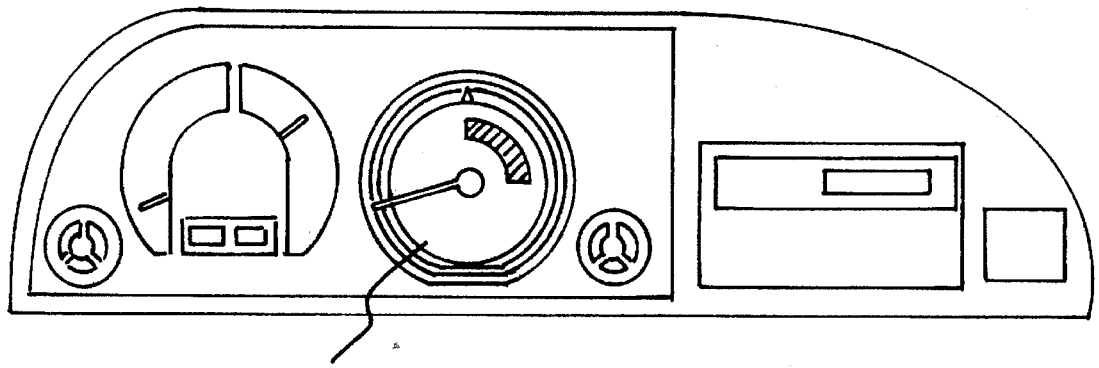

VEHICULAR SAFETY DISTANCE ALARM SYSTEM

BACKGROUND OF THE INVENTION

1. Field of the Invention

The present invention relates to a vehicular safety distance alarm system and more particularly pertains to monitoring a travelling distance between a source vehicle and a target vehicle and activating an alarm when a predetermined safety distance defined between the two for a given speed is compromised with a vehicular safety distance alarm system.

2. Description of the Prior Art

The use of vehicular alarm systems is known in the prior art. More specifically, vehicular alarm systems heretofore devised and utilized for the purpose of monitoring the travelling distance between vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,139,327 to Tanaka dislcoses a vehicle following apparatus with a distance measuring function. U.S. Pat. No. 5,159,557 to Ogawa discloses a distance detecting apparatus and method for a vehicle. U.S. Pat. No. 5,187,537 to Asayama discloses a vehicle following apparatus. U.S. Pat. No. 5,212,467 to Park discloses an object detecting apparatus for use in an automobile. U.S. Pat. No. 5,214,408 to Asayama discloses a distance detecting apparatus for a vehicle.

While these vehicle fulfill their respective, particular objective and requirements, the aforementioned patents do not describe a vehicular safety distance alarm system that monitors a travelling distance between a source vehicle and a target vehicle and activates an alarm when a predetermined safety distance defined between the two for a given speed is compromised.

In this respect, the vehicular safety distance alarm system according to the present invention subtantially departs from the conventional concepts and designs of the prior art, and in doing so provides an apparatus primarily developed for the purpose of monitoring a travelling distance between a source vehicle and a target vehicle and activating an alarm when a predetermined safety distance defined between the two for a given speed is compromised.

Therefore, it can be appreciated that there exists a continuing need for new and improved vehicular safety distance alarm system which can be used for monitoring a travelling distance between a source vehicle and a target vehicle and activating an alarm when a predetermined safety distance defined between the two for a given speed is compromised. In this regard, the present invention substantially fulfills this need.

SUMMARY OF THE INVENTION

In the view of the foregoing disadvantages inherent in the know types of vehicular alarm systems now present in the prior art, the present invention provides an improved vehicular safety distance alarm system. As such, the general purpose of the present invention, which will be described subsequently in greater detail, is to provide a new and improved vehicular safety distance alarm system and method which has all the advantages of the prior art and none of the disadvantages.

To attain this, the present invention essentially comprises, in combination, a distance meter. The distance meter includes a hollow, rigid, and essentially box-shaped container having a pivotable stand coupled thereto and extended downwards therefrom for adhesively coupling with a dashboard of a source vehicle and a bubble-level coupled thereto for ensuring its proper positioning on the stand for use. The distance meter includes distance measuring circuitry disposed within the container with positioning on the stand for use. The distance meter includes distance measuring circuitry disposed within the container with the distance measuring circuitry having a transmitter for transmitting a plurality of incident pulse signals towards a remote target vehicle, a receiver for receiving reflected incident pulse signals from the target vehicle, a timer coupled to the receiver and transmitter for determining a time period between a transmitted incident pulse and subsequently received reflected incident pulse, and signal generator circuitry for transmitting a distance signal representing a travelling distance between the source vehicle and the target vehicle based upon a known velocity of the incident pulse signal and the time period from the timer. Lastly, the distance meter includes selection circuity disposed within the container and coupled to the distance measuring circuitry for receiving the distance signal therefrom with the selection circuitry having a orientable selector switch extended from the container. The selection circuitry transmits a first deflection signal when the selector switch is placed in a first mode indicating a two second safety distance between the source vehicle and the target vehicle is desired. The selection circuitry transmits a second deflection signal when the selector switch is placed in a second mode indicating that a three second safety distance between the source vehicle and the target vehicle is desired.

A readout meter is provided. The readout meter includes a scaling plate adapted to be coupled to the dashboard of a vehicle with the scaling plate having a first scale disposed thereon indicating possible speeds of the source vehicle, a second scale disposed thereon indicating safety distances as measured in a time interval of two seconds with the safety distances on the second scale correlated to the speeds on the first scale, and a third scale disposed thereon indicating safety distances as measured in a time interval of three seconds with the safety distances on the third scale correlated to speeds on the first scale. The readout meter includes a distance measurement needle having a generally circular plastic plate with an upper surface and a lower surface, a prong peripherally extended from the plate defining a measurement point with the prong having a leading edge and a trailing edge, a contact pad formed of an electrically conductive material disposed on the upper surface of the plate beginning at a location near the leading edge of the prong and terminated at a clockwise angular distance therefrom. The distance measurement needle is coupleable with deflection means of a dashboard of a source vehicle for allowing it to be angularly deflected with respect to the second scale upon receipt of the first deflection signal in the first mode and deflected with respect to the third scale upon receipt of the second deflection signal in the second mode. Lastly, the readout meter includes a speed measurement needle formed of an electrically conductive material disposed over the scaling plate with the speed measurement needle coupleable with deflection means of a dashboard of a source vehicle for allowing it to be angularly deflected with respect to the first scale upon receipt of an indication of speed of the source vehicle, with deflection of the speed measurement needle upon the contact pad of the distance measurement needle generating an alarm signal indicating that a safety distance has been compromised.

An alarm is included. The alarm has a light source and a speaker extended from the container and coupled to the readout meter with the alarm providing a visual and audible indication that a safety distance has been compromised upon receipt of an alarm signal. A power switch is included and extended from the container. The power switch has a terminal with a first port connected to the alarm. The first port is also connectable to an automatic brake system of a source vehicle. The power switch also has a second port connectable to a power source of a source vehicle. The power switch has one mode for energizing the distance meter, readout meter, and alarm and another mode for de-energizing the distance meter, readout meter, and alarm. Lastly, an auto-brake switch is extended from the container. The auto-brake switch has a terminal with a first port connected to the speed measurement needle and the alarm and a second port connectable to an automatic brake system of a vehicle. The auto brake switch has one mode for energizing the automatic brake system of a source vehicle, whereby allowing the automatic brake system to be engaged upon receipt of an alarm signal, and another mode for de-energizing the automatic brake system of a source vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular safety distance alarm system which has all the advantages of the prior art vehicular alarm systems and none of the disadvantages.

It is another object of the present invention to provide a new and improved vehicular safety distance alarm system which may be easily and efficiently manufactured and marketed.

It is a further object of the present invention to provide a new and improved vehicular safety distance alarm system which is of durable and reliable construction.

An even further object of the present invention is to provide a new and improved vehicular safety distance alarm system which is susceptible of a low cost of manufacture with regard to both materials and labor, and which accordingly is then susceptible of low prices of sale to the consuming public, thereby making such a vehicular safety distance alarm system economically available to the buying public.

Still yet another object of the present invention is to provide a new and improved vehicular safety distance alarm system which provides in the apparatuses and methods of the prior art some of the advantages thereof, while simultaneously overcoming some of the disadvantages normally associated therewith. Even still another object of the present invention is to provide a new and improved vehicular safety distance alarm system for monitoring a travelling distance between a source vehicle and a target vehicle and activating an alarm when a predetermined safety distance defined between the two for a given speed is compromised.

Lastly, it is an object of the present invention to provide a new and improved vehicular safety distance alarm system comprising distance measurement means coupled to a source vehicle for determining and transmitting a distance signal representing a travelling distance between the source vehicle and a remote target vehicle; selection means coupled to the source vehicle for allowing a driver to select a desired range of safety distances expressed as a function of source vehicle velocity and a set time to reach a target vehicle; alarm signal generation means coupled to the distance measurement means and selection means for comparing the distance signal to a safety distance at a given source vehicle velocity and transmitting an alarm signal when the safety distance is compromised; and alarm means coupled to the alarm signal generation means for providing an indication upon receipt of an alarm signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a schematic view depicting the electrical coupling between the speed measurement needle and the contact pad on the distance measurement needle. When the safety distance is compromised, the speed measurement needle is deflected upon the contact pad of the distance measurement needle to complete a circuit and energize the alarm of the present invention and brake system of a vehicle. When the speed measurement needle is deflected away from the contact pad of the distance measurement needle, the circuit is broken and the alarm and automatic brake system of a vehicle are de-energized.

FIG. 8 is a view of the readout meter coupled to the instrument panel on a dashboard of a vehicle.

FIG. 9 is a schematic of the distance measuring circuitry employed in the present invention.

The same reference numerals refer to the same parts through the various Figures.

DESCRIPTION OF THE PREFERRED EMBODIMENT

Figure 1:
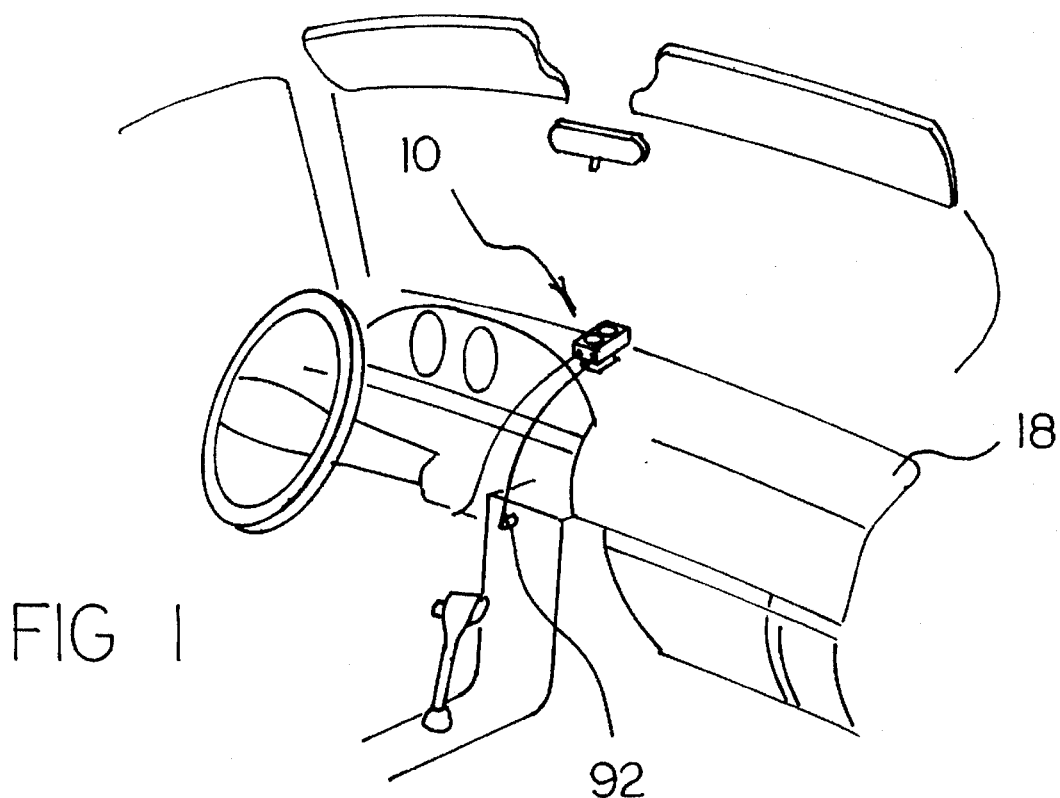
FIG. 1 is a perspective view of the preferred embodiment constructed in accordance with the principles of the present invention secured to a dashboard of a vehicle. The present invention is electrically energized through a cigarette lighter socket of a vehicle.

With reference now to the drawings, and in particular, to FIG. 1 thereof, the preferred embodiment of the new and improved vehicular safety distance alarm system embodying the principles and concepts of the present invention and generally designated by the reference number 10 will be described.

Specifically, the present invention includes five major components. The major components are the distance meter, readout meter, alarm, power switch, and auto-brake switch. These components are interrelated to provide the intended function.

More specifically, it will be noted in the various Figures that the first major component is the distance meter 12. The distance meter is operable when electrically energized. The distance meter includes three subcomponents. The subcomponents are the container, distance measuring circuitry, and selection circuitry. These subcomponents are interrelated for allowing the distance meter to provide its intended function.

Figure 2:
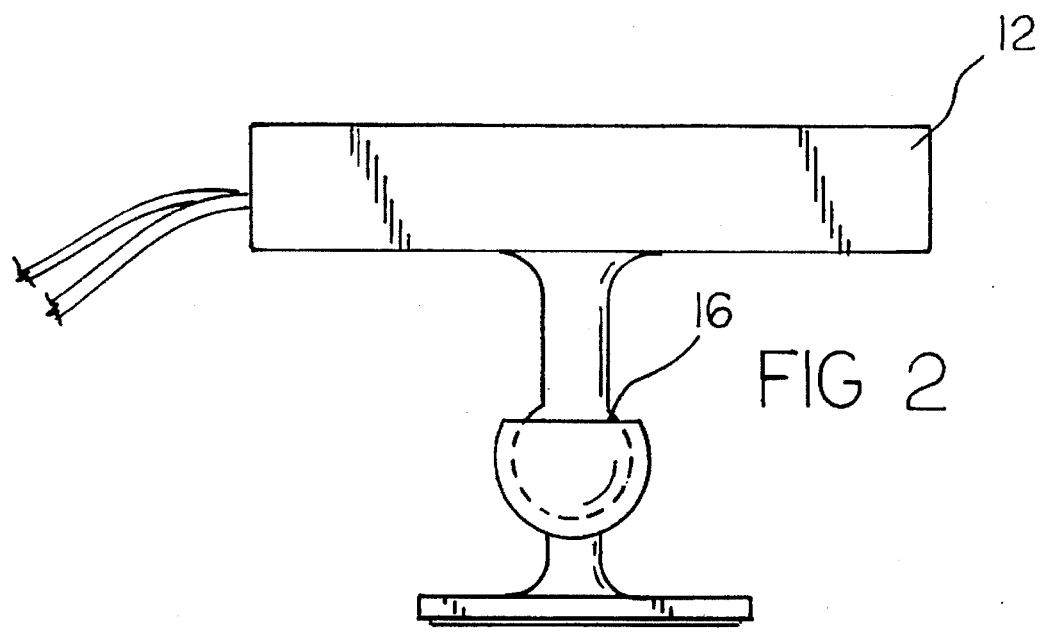
FIG. 2 is a side-elevational view of the pivotal stand used for securing the distance meter of the present invention to a dashboard.
Figure 3:
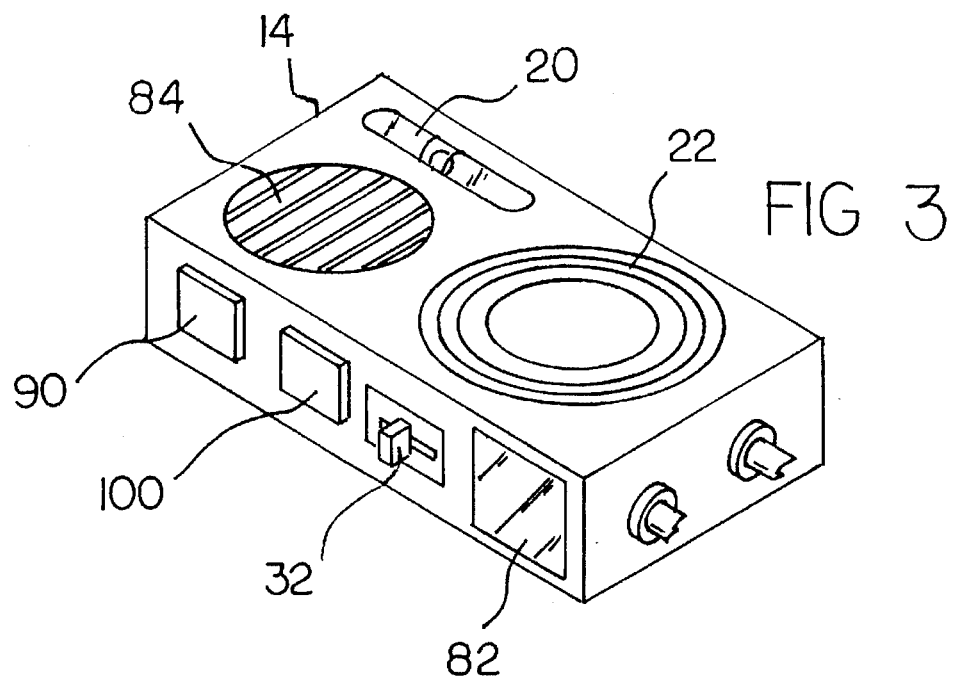
FIG. 3 is a perspective view of the distance meter of the present invention depicted as part of the dashboard in FIG. 1.

In FIGS. 2 and 3, the first sub-component of the distance meter is the container 14. The container is hollow and essentially box-shaped in structure. The container is formed of a rigid material such as plastic or metal. It has a pivotable stand 16 coupled thereto. The stand is formed of a rigid material such as plastic or metal. The stand is essentially T-shaped with a top portion, intermediate portion, and base portion. The stand has a ball and socket joint coupled to its intermediate portion for allowing it to swivel back and forth. The top portion of the stand is coupled to and extended downwards from the container. The stand has a base portion with a strip of adhesive coupled thereto. The strip of adhesive is used to removably secure the base of the stand to a dashboard 18 of a source vehicle near the source vehicle's instrument panel or other location easily viewable by a driver. The container also includes a bubble-level 20 coupled thereupon. The bubble level consists of a vial with two spaced tick marks thereon and liquid disposed therein.

The bubble-level is used for insuring proper positioning of the container upon the stand for use.

The second sub-component of the distance meter is the distance measuring circuitry 22. The distance measuring circuitry is disposed within the container 14. The distance measuring circuitry has a transmitter (FIG. 9; 23) for transmitting a plurality of incident pulse signals towards a remote target vehicle or remote object. The distance measuring circuitry includes a receiver (FIG. 9; 24) for receiving reflected incident pulse signals from the target vehicle (note that through the remainder of this specification, the target vehicle may be taken to be another vehicle or other object of interest such as a tree, mountain, etc.) A timer (FIG. 9; 25) is included and coupled to the receiver and transmitter for determining a propagation time period between a transmitted incident pulse and a subsequently received reflected incident pulse. The travelling distance is calculable based upon a velocity of the incident pulse signal, which is known, and the time period from its transmission to its reception as determined by the timer. Thus, by multiplying the known velocity of the incident pulse signal by half of the propagation time period, a travelling distance between the source vehicle and the target vehicle is determined. However, since the known velocity is constant, this multiplication does not have to be performed, so the travelling distance is essentially represented by the propagation time. Other similar means may be utilized with the present invention for determining a travelling distance. The distance measuring circuitry also includes signal generator circuitry for transmitting a distance signal representing a current travelling distance between the moving source vehicle and the target vehicle. This distance signal is weighted accordingly based upon the travelling distance (i.e. propagation time) determined.

Figure 4:
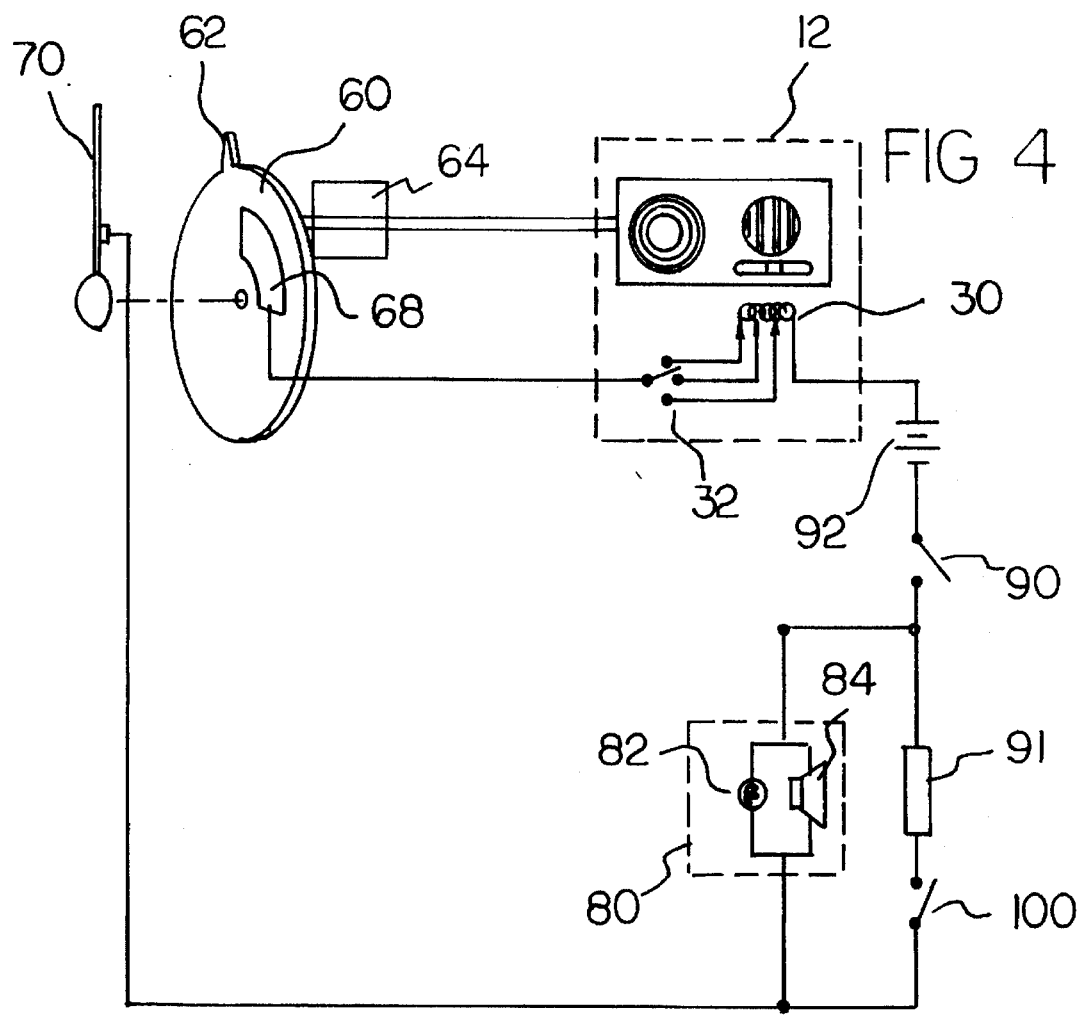
FIG. 4 is a schematic view of the present invention coupled with a power source and an automatic brake system of a vehicle.

In FIG. 4, the third sub-component of the distance meter is the selection circuitry 30. The selection circuitry is disposed within the container 14. It is also coupled to the distance measuring circuitry 22 for receiving the distance signal therefrom. The selection circuitry has an orientable selector switch 32 extended from the container 14. The selection circuitry transmits a first deflection signal based upon the distance signal when the selector switch is placed in a first mode which indicates that a 2 second safety distance between the source vehicle and the target vehicle is desired. The selection circuitry transmits a second deflection signal based upon the distance signal when the selector switch is placed in a second mode which indicates that a 3 second safety distance between the source vehicle and target vehicle is desired. Optionally, the selection circuitry transmits a third deflection signal based upon the distance signal when the selector switch is placed in a third mode which indicates that a 4 second safety distance between the source vehicle and target vehicle is desired. The deflection signal is weighted based upon the distance signal and mode of operation.

The second major component is the readout meter 40. The readout meter is operable when electrically energized. The readout meter includes three subcomponents. The subcomponents are the scaling plate, distance measurement needle, and speed measurement needle. These subcomponents are interrelated to allow the readout meter to perform its intended function.

Figures 5, 6:
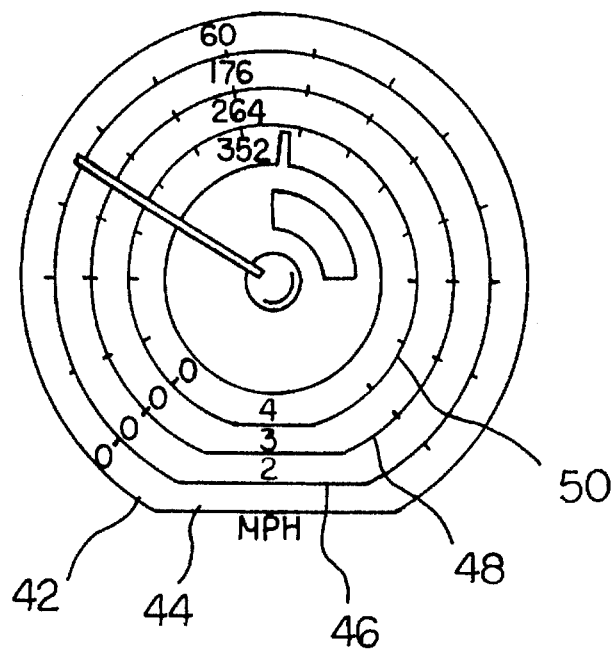
FIG. 5 is a view of the readout meter used for monitoring the speed of a source vehicle and simultaneously monitoring a distance signal representing a travelling distance between the source vehicle and a remote target vehicle and comparing it with predetermined safety distances.
FIG. 6 is a chart depicting the relationship between the speed of a source vehicle and a safety distance between the source vehicle and a target vehicle. In essence, the present functionally embodies this chart for use in a source vehicle.

In FIGS. 5,6,8, the first subcomponent of the readout meter is the scaling plate 42. The scaling plate is adapted to be coupled to the instrument panel of a dashboard 18 of a vehicle. The scaling plate has a first scale 44 disposed thereon indicating possible speeds of the source vehicle. The scaling plate has a second scale 46 disposed thereon indicating predetermined safety distances as measured in a time interval of 2 seconds as a function of possible target vehicle speeds. The safety distances on the second scale correlated to the speeds on the first scale. A 2 second travelling distance is usually recommended under general city driving conditions. The scaling plate includes a third scale 48 disposed thereon. The third scale indicates predetermined safety distances as measured in a time interval of 3 seconds as a function of possible target vehicle speeds. The safety distances on the second scale are correlated to the speeds on the first scale. A 3 second travelling distance is usually recommended under highway driving conditions. Optionally, a fourth scale 50 is disposed on the scaling plate for indicating predetermined safety distances as measured in a time interval of 4 seconds as a function of possible target vehicle speeds. The safety distances on the fourth scale are correlated to speeds on the first scale. A 4 second travelling distance is usually recommended under adverse weather conditions.

In FIGS. 4 and 7, the second subcomponent of the readout meter is the distance measurement needle 60. The distance measurement needle has a generally circular plastic plate with an upper surface and a lower surface. A prong 62 is peripherally extended from the plate and defines a measurement point. The prong has a leading edge 64 and a trailing edge 66. A contact pad 68 is formed of an electrically conductive material and disposed on the upper surface of the plate. The contact pad begins at a location near the leading edge of the prong. The contact pad is inwardly offset from the periphery of the plate. The contact pad is terminated at a clockwise angular distance from the leading edge of the prong. The distance measurement needle is coupleable with a deflection means 64, which is controlled by the distance meter 12, of a dashboard of a source vehicle. The deflection means allows the distance measurement needle to be angularly deflected with respect to the second scale upon receipt of the first deflection signal in the first mode. Furthermore, the deflection means allows the distance measurement needle to be deflected with respect to the third scale upon receipt of the second deflection signal when the selector switch 32 is placed in the second mode. Optionally, the deflection means allows the distance measurement needle to be deflected with respect to the fourth scale upon receipt of the third deflection signal when the selector switch 32 is placed in the third mode.

The third subcomponent of the readout meter is the speed measurement needle 70. The speed measurement needle is elongated and rigid in structure and formed of an electrically conductive material. The speed measurement needle is disposed over the scaling plate 42. The speed measurement needle is coupleable with a deflection means of a dashboard of a source vehicle. The deflection means allows the speed measurement needle to be angularly deflected with respect to the first scale upon receipt of an indication of speed from the source vehicle. This indication of speed is provided through the speedometer of the source vehicle. When the speed measurement needle is deflected upon the contact pad 68 of the distance measurement needle, an alarm signal is generated indicating that a safety distance has been compromised. It has been compromised because base upon the current speed of the source vehicle, the travelling distance between the source vehicle and the target vehicle is now less than the predetermined safety distance. Thus, the possibility of an accident is, therefore, higher in this instance.

In FIG. 4, the third major component is the alarm 80. The alarm has a light source 82 and a speaker 84. Both the light source and speaker are extended from the container 14. The alarm is coupled with the readout meter 40. The alarm provides a visual and audible indication that a safety distance has been compromised upon receipt of an alarm signal.

The fourth major component is the power switch 90. The power switch is extended from the container 14. The power switch has a electrically conductive terminal. The terminal has a first port connected to the alarm 80. This first port is also connectable to an automatic brake system of a source vehicle 91. The terminal also has a second port connectable to a power source 92 of a source vehicle. This power source may be accessible through the lighter socket of a vehicle. The power switch has one mode for energizing the distance meter 12, readout meter 40, and alarm 80. The power switch has another mode for de-energizing the distance meter, readout meter, and alarm.

The fifth major component is the auto-brake switch 100. The auto-brake switch is extended from the container 14. The auto-brake switch has an electrically conductive terminal. The terminal has a first port connected to the speed measurement needle 70 and alarm 80. The terminal also has a second port connectable to an automatic brake system 91 of a source vehicle. The auto-brake switch has one mode for energizing the automatic brake system of a source vehicle, whereby allowing the automatic brake system to be engaged upon receipt of an alarm signal. The auto-brake switch has another mode for de-energizing the automatic brake system of a source vehicle.

Every person is concerned with safety when driving a car. There are many pieces of equipment in a car which are designed to increase safety when an accident happens, such as seat belts, safety air bags, strong bumpers. However, these pieces of equipment only help to reduce the damage or injury when an accident happens. They cannot help to prevent an accident. There exists a need for a special piece of equipment which can efficiently and cost effectively provide protection against an accident. In fact, most car accidents happen at the front end, so keeping a certain distance between two cars is very important. According to a commonly known traffic rule, a 2 second distance is necessary. At highway speeds, this time is increased to 3 seconds. In bad weather conditions, this time is increased to 4 seconds.

In summary, the present invention is generally composed of three parts—a speed measuring part (for owner's car), a distance measuring part, and an alarm system. The speed measuring part can use the original speedometer of the car. The distance measuring part is a small conventional and commercially available piece of equipment placed at the front-center of the car which measures the travelling distance between a source car (owner's car) and a target vehicle in front. Usually, this piece of equipment uses a radar or ultrasonic technology in operation. The alarm system essentially takes distance and speed data and determines a time reading, with time=distance/speed. If the time is less than 2 seconds, the alarm works, a red light flashes and an alarm sound can be heard. The alarm distance can be adjusted. When at highway speed, or in bad weather conditions, the alarm distance can be increased. The whole system can be closed by a switch. The preferred embodiment uses analog components to form the distance measuring part and the speed measuring part. The distance measuring part and the speed measuring part may be replaced totally or in part with digital circuitry and still achieve the same function. For example, the distance measurement needle and the speed measurement needle of the preferred embodiment can be replaced with comparable digital measurement devices. Furthermore, digital circuitry may be included for allowing a user to select and display a desired range of safety distances expressed as a function of source vehicle velocity and a set time to reach a target vehicle.

The present invention will always remind the driver to keep the safety distance from the front vehicle. The driver does not need to measure the travelling distance so he can pay more attention to the road. When the driver is sick or tired or not concentrating on the road because of talking, thinking or other distraction, this system can remind him to pay more attention to the travelling distance. When the weather is bad (fog, rain, or darkness) and the driver can not see very well; this system can help the driver to find the object or car in front. Thus, this system can help the driver avoid an accident.

The present invention can work in conjunction with an automatic brake system of a vehicle. When your car is too close to the front object or vehicle and the present invention generates and alarm signal, the automatic brake will start to work automatically (or a some time later so the driver will have a chance to adjust his speed himself). This auto-brake system will be very effective at preventing an accident, especially a front end accident.

The readout meter depicts speed correlated to following distances. As shown in FIGS. 5 and 6, for example, when the speed measurement needle shows 60 mph, 264 feet is the 3 second distance reading and 176 feet is the 2 second distance reading. This means that the travelling distance between your car and the front car is should not be less than 176 feet following the 2 second following distance rule. If you drive too fast and your speed is more than 60 mph under the 2 second rule, the speed measurement needle will pass over the distance measurement needle to the contact pad thereof, thereby activating the alarm and the auto-brake system (if present).

The present invention issues a warning when a vehicle is proceeding under potentially dangerous conditions. Automotive vehicles are now equipped with many safety features, including seat restraints, air bags, anti-locking braking systems, energy absorbing bumpers, and the like. Most are designed to protect the occupants in the event of an accident, but there is a shortage of devices whose purpose is to help prevent them from occurring. While it may be impossible to prevent their occurrence, it is very feasible to provide some method of warning when they may be likely to occur. This invention offers a system which will advise the user when something should be done to reduce the possibility of collisions.

This device determines how fast the vehicle is moving, and how much distance exists between it and the car, truck, or motorcycle that is in front of it. A tremendous amount of data has been compiled which deals with stopping times and distances when moving at all rates of speed. By determining the travelling distance between the two vehicles and the speed of the following unit, the present invention determines if they are proceeding in a safe manner. If they are not, an alarm is sounded.

This invention is a distance measuring device that is mounted on the front of the vehicle to determine how far away it is from the vehicle in front of it. A specially designed unit relates that distance to the speed of the vehicle, obtained from its speedometer. If the relationship is not safe, the alarm is automatically activated. The unit can be adjusted manually to compensate for unusual conditions by increasing the time allowed for stopping.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicular safety distance alarm system for monitoring a travelling distance between a source vehicle and a remote target vehicle and activating an alarm when a predetermined safety distance defined between said source and target vehicles for a given speed is compromised comprising, in combination:

1) a distance meter further comprising:
   a hollow, rigid, and essentially box-shaped container having a pivotable stand coupled thereto and extended downwards therefrom for adhesively coupling with a dashboard of a source vehicle and a bubble-level coupled thereto for ensuring its proper positioning on the stand for use;
   a distance measuring circuitry disposed within the container, the distance measuring circuitry having a transmitter for transmitting a plurality of incident pulse signals towards the remote target vehicle, a receiver for receiving reflected incident pulse signals from the target vehicle, a timer coupled to the receiver and the transmitter for determining a time period between a transmitted incident pulse signal, and a signal generator circuitry for transmitting a distance signal representing the travelling distance between the source vehicle and the target vehicle based upon a known velocity of the incident pulse signals and the time period from the timer; and
   a selection circuitry disposed within the container and coupled to the distance measuring circuitry for receiving the distance signal therefrom, the selection circuitry having an orientable selector switch extended from the container with the selection circuitry transmitting a first deflection signal when the selector switch is placed in a first mode indicating a two second safety distance between the source vehicle and the target vehicle is desired and the selection circuitry transmitting a second deflection signal when the selector switch is placed in a second mode indicating that a three second safety distance between the source vehicle and the target vehicle is desired;

2) a readout meter further comprising:
   a scaling plate adapted to be coupled to the dashboard of the source vehicle, the scaling plate having a first scale disposed thereon indicating the speeds of the source vehicle, a second scale disposed thereon indicating safety distances as measured in a time interval of two seconds with the safety distances on the second scale correlated to the speeds on the first scale, and a third scale disposed thereon indicating safety distances as measured in a time interval of three seconds with the safety distances on the third scale correlated to the speeds on the first scale;

a distance measurement needle having a generally circular plastic plate with an upper surface and a lower surface, a prong peripherally extended from the circular plastic plate defining a measurement point with the prong having a leading edge and a trailing edge, a contact pad formed of an electrically conductive material disposed on the upper surface of the circular plastic plate beginning at a location near the leading edge of the prong and terminated at a clockwise angular distance therefrom, the distance measurement needle couplable with deflection means of the dashboard of the source vehicle for allowing it to be angularly deflected with respect to the second scale upon receipt of the first deflection signal in the first mode and deflected with respect to the third scale upon receipt of the second deflection signal in the second mode;

a speed measurement needle formed of an electrically conductive material disposed over the scaling plate, the speed measurement needle coupleable with the deflection means of the dashboard of the source vehicle for allowing it to be angularly deflected with respect to the first scale upon receipt of an indication of the speed of the source vehicle, with deflection of the speed measurement needle upon the contact pad of the distance measurement needle generating an alarm signal indicating that a safety distance has been compromised;

3) the alarm having a light source and a speaker extended from the container and coupled to the readout meter, the alarm providing a visual and audible indication that a safety distance has been compromised upon receipt of the alarm signal;

4) a power switch extended from the container, the power switch having a terminal with a first port connected to the alarm and connectable to an automatic brake system of the source vehicle and a second port connectable to a power source of the source vehicle, the power switch having one mode for energizing the distance meter, the readout meter, and the alarm and another mode for de-energizing the distance meter, the readout meter, and the alarm; and 5) an auto-brake switch extended from the container, the auto-brake switch having a terminal with a first port connected to the speed measurement and the alarm and a second port connectable to the automatic brake system of the source vehicle, the auto-brake switch having one mode for energizing the automatic brake system of the source vehicle, whereby allowing the automatic brake system to be engaged upon receipt of the alarm signal, and another mode for de-energizing the automatic brake system of the source vehicle.

* * * * *